United States Patent [19]

Miyasaka

[11] Patent Number: 5,005,033
[45] Date of Patent: Apr. 2, 1991

[54] PHOTOGRAPHING DATA SETTING APPARATUS FOR CAMERA

[75] Inventor: Tetsuo Miyasaka, Machida, Japan

[73] Assignee: Olympus Optical Company, Ltd., Tokyo, Japan

[21] Appl. No.: 386,580

[22] Filed: Jul. 27, 1989

[30] Foreign Application Priority Data

Aug. 1, 1988 [JP] Japan ................................ 63-192555

[51] Int. Cl.$^5$ ............................................. G03B 17/00
[52] U.S. Cl. ................................................ 354/289.1
[58] Field of Search ............ 354/289.1, 289.11, 289.12, 354/486

[56] References Cited

U.S. PATENT DOCUMENTS

| | | | |
|---|---|---|---|
| 4,598,986 | 7/1986 | Shiratori et al. | 354/289.1 X |
| 4,687,308 | 8/1987 | Someya | 354/289.1 |
| 4,693,584 | 9/1987 | Miyasaka | 354/446 |
| 4,745,428 | 5/1988 | Miyasaka | 354/443 |

FOREIGN PATENT DOCUMENTS

58-63922 7/1983 Japan .
63-37320 10/1988 Japan .

Primary Examiner—Brian W. Brown
Attorney, Agent, or Firm—Frishauf, Holtz, Goodman & Woodward

[57] ABSTRACT

A camera has a rotary operation member, a detection unit, a photographing data setting circuit, and a pulse signal generation unit. The rotary operation member is exposed from a plurality of portions of the camera to be able to be operated from a plurality of directions. The detection unit detects a rotation of the operation member from a predetermined portion and generates a detection signal. The pulse signal generation unit generates a pulse signal in accordance with rotation of the rotary operation member. The photographing data setting circuit sets predetermined photographing data in accordance with the detection output from the detection unit on the basis of the pulse output from the pulse signal generation unit, thus setting and storing a plurality of photographing data.

25 Claims, 10 Drawing Sheets

| EXPOSURE MODE | REGISTER | |
|---|---|---|
| | BINARY NOTATION | DECIMAL NOTATION |
| PROGRAM | 0  0 | 0 |
| APERTURE PRIORITY | 0  1 | 1 |
| SHUTTER PRIORITY | 1  0 | 2 |
| MANUAL | 1  1 | 3 |

F I G. 22

F I G. 23

PHOTOGRAPHING DATA SETTING APPARATUS FOR CAMERA

Background of the Invention

1. Field of the Invention

The present invention relates to a camera and, more particularly, to a photographing data setting apparatus for a camera which has an operation member for selecting a type of photographing data and changing a value of the photographing data and can commonly use a single operation member for a plurality of different photographing data.

2. Description of the Related Art

Published Unexamined Japanese Patent Application Nos. 58-63922 and 63-37320 disclose photographing data setting apparatuses for conventional cameras.

In an apparatus disclosed in Published Unexamined Japanese Patent Application No. 58-63922, upon operation of a rotary operation member, i.e., a dial which can change a plurality of binary data stepwise according to its rotational amount, photographing data of a camera is set. In an apparatus disclosed in Published Unexamined Japanese Patent Application No. 63-37320, when a shutter speed and an aperture value upon manual exposure of a camera are set, a push-type switch as an operation member independently of a dial (rotary operation member) is turned on/off to select one of the shutter speed and the aperture value to be set. The selected data is changed and set by the operation of the dial.

The photographing data setting apparatus disclosed in Published Unexamined Japanese Patent Application No. 58-63922 has dials corresponding to types of photographing data. The type of photographing data is selected by one of the dials, and the corresponding setting value is changed upon operation of the dial. In this apparatus, however, if the number of types of photographing data is increased, the number of dials must be increased accordingly. Thus, this apparatus is disadvantageous in terms of space, and each dial has a small diameter due to a limitation of space, resulting in poor operability. In addition, if the number of types of photographing operations is increased, the number of inputs to a processing circuit for detecting a rotational amount of each dial is increased, and a circuit size is undesirably increased.

In the exposure data setting apparatus disclosed in Published Unexamined Japanese Patent Application No. 63-37320, the push type switch is turned on/off to select one of the shutter speed and the aperture value to be set. In this apparatus since a dial must be turned while pushing the push type switch, a cumbersome operation is required, and an operation error tends to occur. Especially, if the number of data to be selected is increased, the operation becomes extremely cumbersome.

SUMMARY OF THE INVENTION

The present invention has been made in consideration of these problems as "a subject matter to be solved", and has as its object to provide a photographing data setting apparatus for a camera which can reliably select and set photographing data by simply operating one operation member, and has good operability.

A photographing data setting apparatus for a camera according to the present invention comprises a rotary operation member which is exposed from a plurality of portions of the camera to be able to be turned from a plurality of directions, a detection unit for detecting a turning operation of the operation member from a predetermined portion, a photographing data setting circuit for setting and storing a plurality of types of photographing data, and a pulse signal generation unit for generating a pulse signal upon a turning operation of the rotary operation member, wherein the photographing data setting circuit is caused to update photographing data of a type corresponding to a detection output from the detection unit in accordance with a pulse output from the pulse signal generation unit.

According to the photographing data setting apparatus for a camera of the present invention, an operation for selecting one of a plurality of types of photographing data and setting its value can be performed with one finger from a predetermined operation direction (e.g., a front surface side/rear surface side) with respect to the single operation member. For this reason, holdability of a camera can be improved.

In a conventional apparatus, when a plurality of types of photographing data are set by an operation with one finger, operation members must be individually arranged in units of photographing data. However, in the present invention, since only one operation member can be arranged, advantages in space and cost can be provided. When a resolution, i.e., precision of detection of an operation amount is to be increased, the dimensions of the operation member and a detector for the operation amount must be increased. In this case, the present invention is particularly effective.

DETAILED DESCRIPTION OF THE PREFERRED EMBODIMENTS

Figure 1:
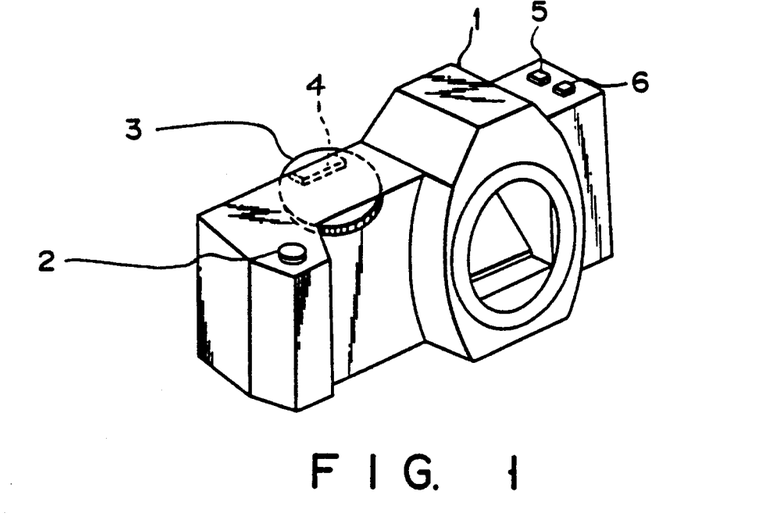
FIG. 1 is a perspective view showing an outer appearance of a first embodiment of the present invention.

FIG. 1 schematically shows an outer appearance of a first embodiment of the present invention in which a photographing data setting apparatus of the present invention is applied to a single-lens reflex camera with an interchangeable lens. FIG. 1 shows a state wherein a lens of the camera is detached.

A camera body 1 is provided with a release button 2, a dial 3 as a rotary operation member for setting a value of photographing data, and switches 4, 5, and 6 for selecting types of photographing data. The switches 4, 5, and 6 are respectively a selection switch, a sensitivity switch, and a mode switch. Peripheral portions of the dial 3 project from the front and rear surfaces of the camera body 1, respectively. The selection switch 4 is arranged near the rear-surface projecting portion of the dial 3 to be responsive to only a dial operation from the rear surface side. It can be discriminated in accordance with the selection switch 4 whether the portion of the dial 3 projecting from the rear or front surface of the camera body 1 is operated. Therefore, a photographer can operate a portion of the dial 3 projecting from the front surface of the camera body 1 with his or her first finger or can operate a portion of the dial 3 projecting from the rear surface of the camera body 1 with his thumb to simultaneously select and set desired photographing data.

Figure 2:
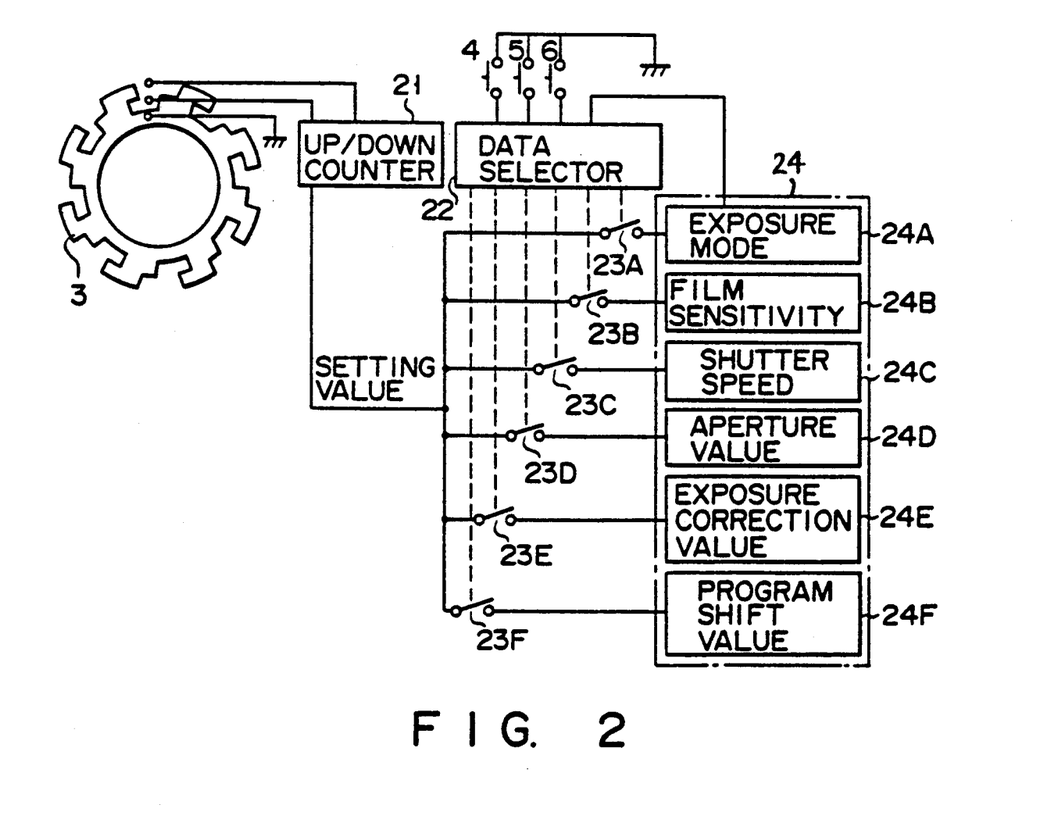
FIG. 2 is a schematic block diagram of the first embodiment.
Figure 3:
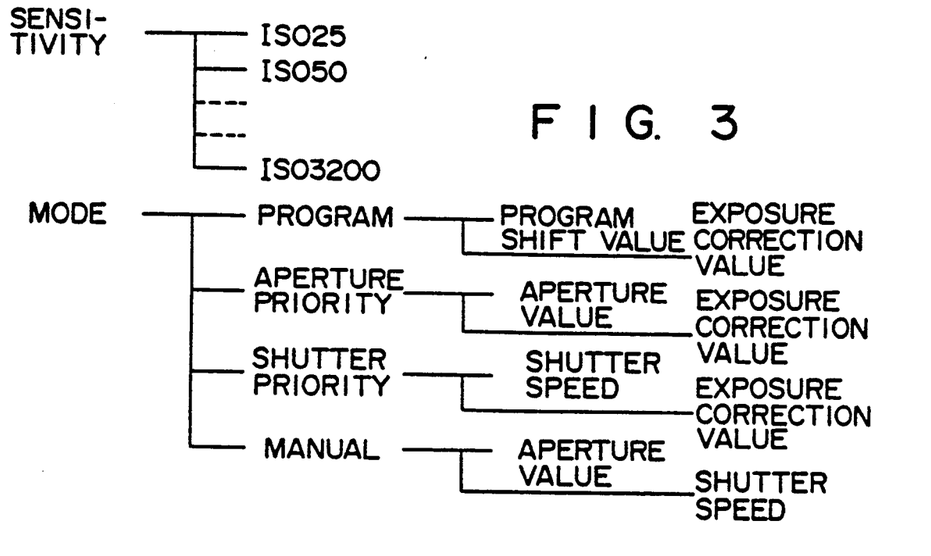
FIG. 3 is a chart for explaining an operation of the first embodiment.
Figure 15:
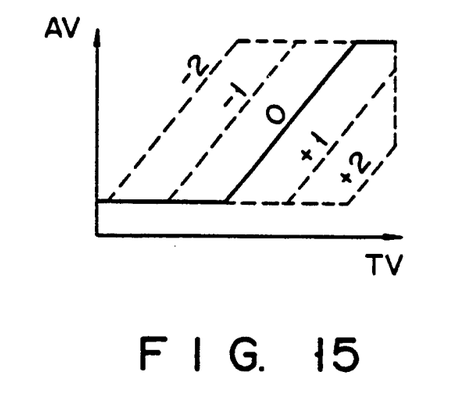
FIG. 15 shows an example of a program chart.
Figure 16:
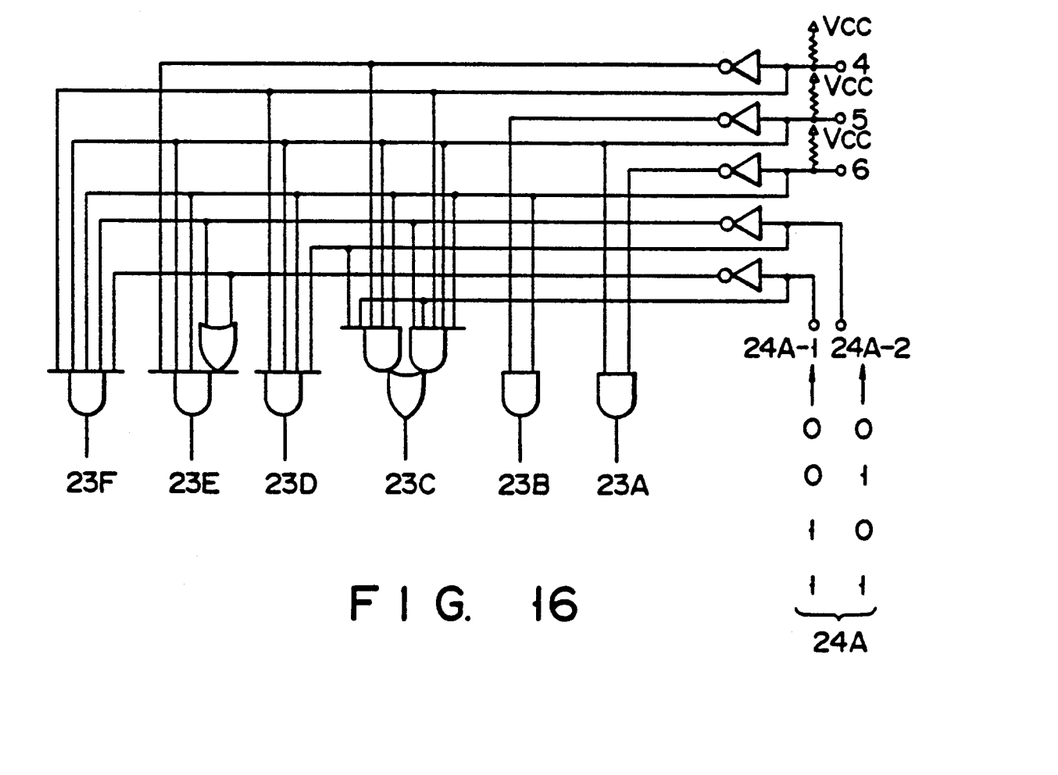
FIG. 16 is a circuit diagram showing a detailed arrangement of a data selector shown in FIG. 2.

FIG. 2 is a block diagram of a portion associated with selection and setting of photographing data. As shown in FIG. 2, the dial 3 is provided integrally with electrodes constituted by a common electrode portion and two comb-shaped electrode portions having different phases. Contact terminals fixed to stationary members (not shown) are arranged at positions opposing these electrodes. When the dial 3 is turned, two pulse signals having different phases according to the turning direction of the dial are generated at the contact terminals corresponding to the comb-shaped electrode portions. The contact terminals outputting these pulse signals are connected to an up/down counter 21. The up/down counter 21 detects the phase relationship between the two pulse signals, switches up-counting and down-counting in accordance with a phase shift direction, and counts one of the up- and down-counting pulses. In this manner, the up/down counter 21 counts pulses according to the turning direction and turning amount of the dial. The switches 4, 5, and 6 are connected to a data selector 22 for determining photographing data to be changed by the value of the counter. The data selector 22 selectively turns on switches 23A, 23B, 23C, 23D, 23E, and 23F in accordance with the operations of the switches 4, 5, and 6 to supply the outputs from the up/down counter 21 to an exposure mode holding section 24A, a film sensitivity holding section 24B, a shutter speed holding section 24C, an aperture value holding section 24D, an exposure correction value holding section 24E, and a program shift value holding section 24F in a photographing data holding section 24, thus selectively setting/updating the data. These holding sections 24A to 24F comprise registers, respectively. The switches 4, 5, and 6 will be respectively referred to as "selection", "sensitivity", and "mode" switches, and FIG. 3 shows selection contents of types of photographing data when the dial 3 is turned while each of the "selection", "sensitivity", and "mode" switches 4, 5, and 6 is ON. When the dial is turned while the sensitivity switch 5 is ON, a film sensitivity is changed like ISO25, ISO50,..., ISO3200. When the dial is turned while the mode switch 6 is ON, an exposure mode is changed to a program mode, an aperture priority mode, a shutter priority mode, a manual mode, and the like in turn. When the sensitivity and the exposure mode are set, the dial 3 can be operated from either the front or rear surface side. Thus, the sensitivity and the exposure mode can be set when the dial is operated in either direction. A case after the exposure mode has been set will be described below. When the exposure mode is the program mode, if the dial 3 is turned from the front surface side of the body 1 (with the first finger), a program shift value is changed since the selection switch 4 is OFF. In this state, if the dial 3 is turned from the rear surface side (with the thumb), it can be pivoted while the selection switch 4 is ON, so that an exposure correction value is changed. The program shift value indicates an amount for shifting a program chart for exposure control. The program chart is expressed as shown in FIG. 15, and a program shift operation is to select one of a plurality of program lines between −2 to +2 shown in FIG. 15. When the exposure mode is the aperture priority mode, if the dial 3 is turned from the front surface side of the body 1, the aperture value is changed since the selection switch 4 is OFF; if it is turned from the rear surface side, an exposure correction value is changed since the selection switch 4 is ON. When the exposure mode is the shutter priority mode, if the dial 3 is turned from the front surface side of the body 1, a shutter speed is changed; if it is turned from the rear surface side, the exposure correction value is changed. When the exposure mode is the manual mode, if the dial 3 is turned from the front surface side of the body 1, the aperture value is changed; if it is turned from the rear surface side, the shutter speed is changed. FIG. 16 is an internal circuit diagram of the data selector 22 shown in FIG. 2.

A second embodiment of the present invention, as a detailed arrangement of the present invention, will be described below. This embodiment exemplifies an arrangement of the selection switch 4 shown in FIG. 1 in more detail.

Figure 4:
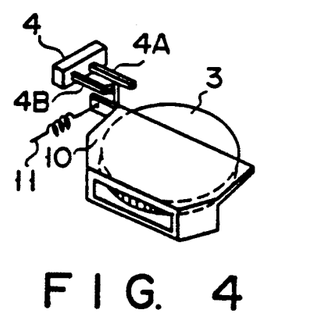
FIG. 4 is a perspective view of a main part for explaining a second embodiment of the present invention.

In FIG. 4, a selection switch 4 has contacts 4A and 4B. The contacts 4A and 4B are turned on/off upon operation of a cover member 10 which covers a rear-surface portion of a dial 3 excluding a portion near a distal end face on the rear surface side and is movable in a back-and-forth direction. The cover member 10 is always biased by a spring 11 in a direction toward the rear surface, and is held at a predetermined position to cover most of the rear-surface portion of the dial 3.

Figure 5:
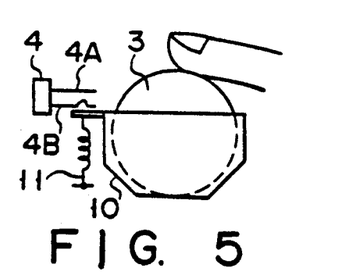
FIG. 5 and 6 are views for explaining an operation of the second embodiment.
Figure 6:
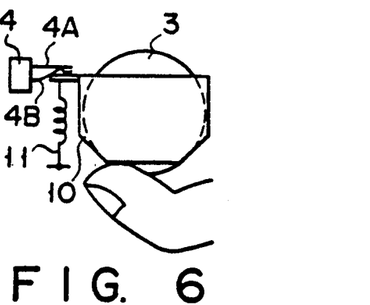

When the dial 3 is turned from the front surface side, the cover member 10 is not moved, as shown in FIG. 5, and the selection switch 4 is OFF. For example, in the aperture priority mode shown in FIG. 3, the aperture value is changed. When the dial 3 is turned from the rear surface side, the cover member 10 is pushed forward, as shown in FIG. 6 to turn on the selection switch 4. For example, in the aperture priority mode in FIG. 3, the exposure correction value is changed.

In FIG. 4, the cover member 10 covers the upper and lower surfaces of the dial 3. Alternatively, a flat member may be arranged above or below the dial 3. The spring 11 may also serve as a contact portion of the switch 4. Letters "AV" indicating an aperture value, "±" indicating exposure correction, and the like may be printed on the upper surface of the cover member 10, so that a user can externally confirm the type of selected photographing data.

A third embodiment of the present invention will now be described. This embodiment exemplifies the selection switch 4 shown in FIG. 1 different from that in the second embodiment.

Figure 7:
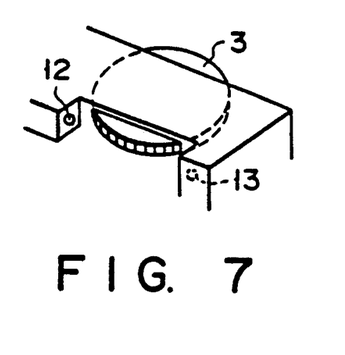
FIG. 7 is a perspective view of a main part for explaining a third embodiment of the present invention.
Figure 8:
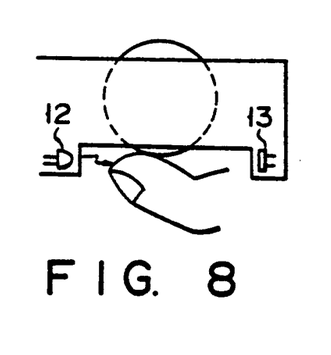
FIG. 8 is a view for explaining an operation of the third embodiment.
Figure 9:
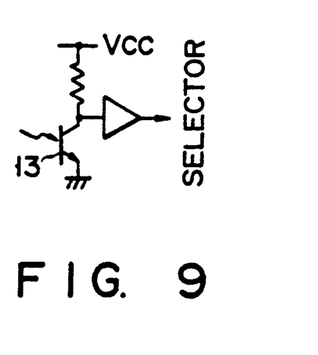
FIG. 9 is a partial circuit diagram of an arrangement of the third embodiment.

As shown in FIG. 7, a light-emitting diode 12 and a light-receiving element 13 are arranged at two sides of an exposure portion of a dial 3 on the rear side of a camera body 1 to oppose each other. The light-emitting diode 12 and the light-receiving element 13 are arranged as shown in FIG. 8 when viewed from the top such that light emitted from the light-emitting diode 12 to the light-receiving element 13 is shielded by a finger upon operation of the dial 3 from the rear surface side. The light-receiving element 13 comprises, e.g., a phototransistor, as shown in FIG. 9, and its output is connected to a data selector 22. In this manner, reliability can be improved by using a non-contact detection means.

In this embodiment, a so-called "photointerruptor" is constituted by the light-emitting diode 12 and the light-receiving element 13. Alternatively, a so-called "photoreflector" which receives light reflected by a finger may be employed, thus providing the same effect.

A fourth embodiment of the present invention will be described below. This embodiment exemplifies the selection switch 4 shown in FIG. 1 different from those in the second and third embodiments.

Figure 10:
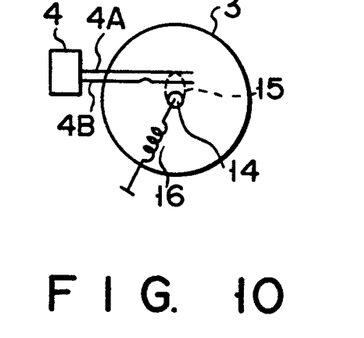
FIG. 10 is a view showing an arrangement of a main part for explaining a fourth embodiment of the present invention.

As shown in FIG. 10, a rotating shaft 14 of a dial 3 is supported to be movable along a movement groove 15 formed in a camera body 1. The rotating shaft 14 is always biased in a direction of the rear surface by a spring 16 arranged between itself and the camera body 1. Contacts 4A and 4B of a selection switch 4 are enabled by the rotating shaft 14.

Figure 11:
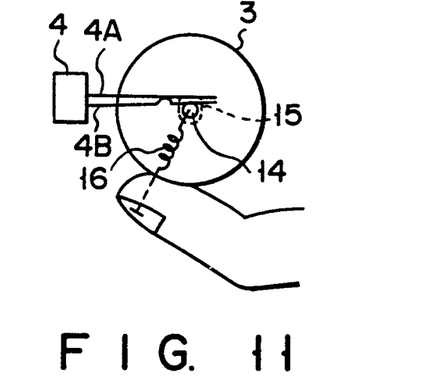
FIG. 11 is a view for explaining an operation of the fourth embodiment.

When the dial 3 is to be turned from the rear surface side, as shown in FIG. 11, the dial 3 is moved forward, and the contacts 4A and 4B of the switch 4 are brought into contact with each other to be electrically connected.

Figure 12:
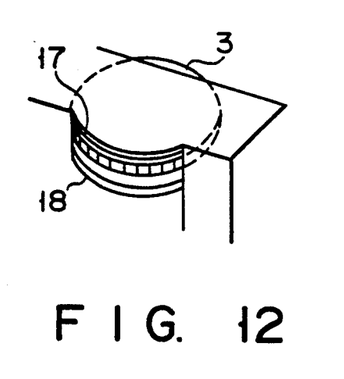
FIG. 12 is a perspective view of a main part for explaining a fifth embodiment of the present invention.
Figure 13:
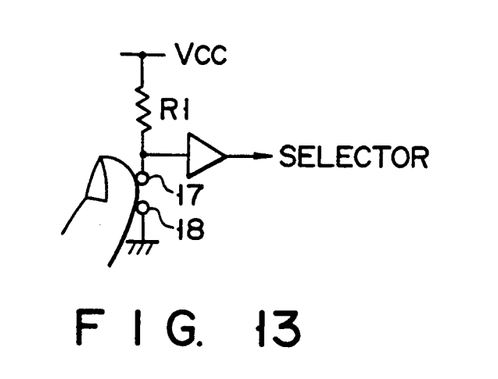
FIG. 13 is a circuit diagram of a main part for explaining an operation of the fifth embodiment.

A fifth embodiment of the present invention will be described below. This embodiment exemplifies the selection switch 4 shown in FIG. 1 different from those in the second, third, and fourth embodiments. As shown in FIG. 12, conductive contact patterns 17 and 18 are formed on the upper and lower surfaces of a dial 3. These conductive patterns 17 and 18 are connected to a circuit shown in FIG. 13 to form a so-called "touch sensor". The operation of the dial 3 from the rear surface side can be detected by the touch sensor constituted by these contact patterns 17 and 18. One of the contact patterns 17 and 18 need not always be arranged near the dial but may be arranged at, e.g., a grip portion of a camera body 1.

Figure 17A:
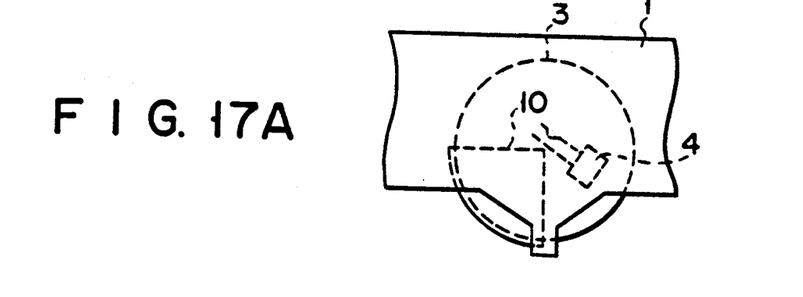
FIGS. 17A and 17B are views showing a modification of a photographing data operation unit.
Figure 17B:
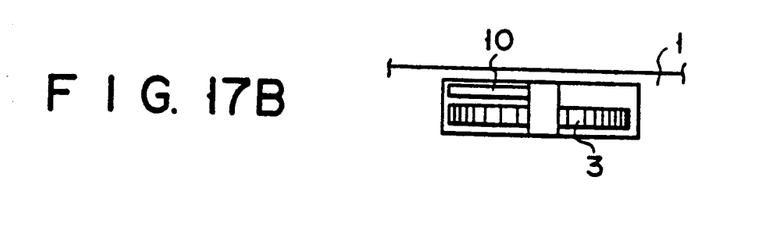
Figure 18A:
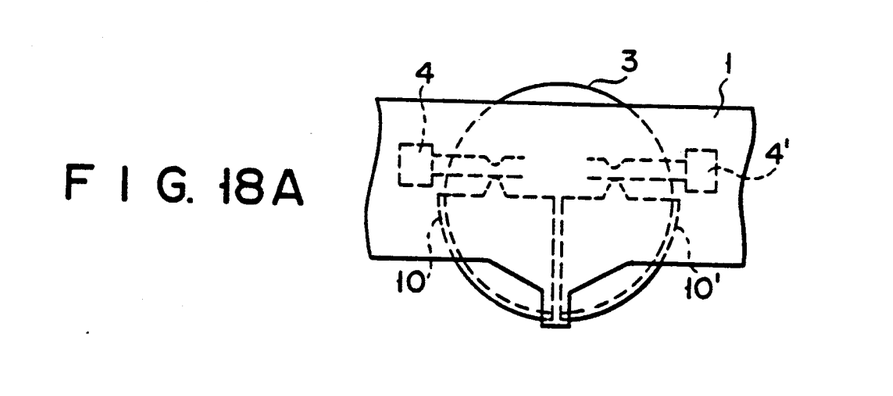
FIGS. 18A and 18B are views showing another modification of a photographing data operation unit.
Figure 18B:
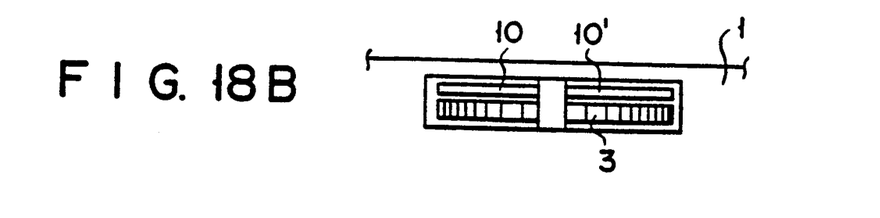

In each of the first to fifth embodiments, the dial 3 projects from the front and rear surfaces of the camera body 1. However, the dial 3 need not project but may be merely exposed as long as it can be operated. The projecting or exposing portions may 1 provided at two positions in the right-and-left direction of the front or rear surface. In addition to the front and rear surfaces, a projecting portion may be provided at a side surface, and a detection means such as a photographing data selection switch may be added. FIGS. 17A and 17B illustrate a case wherein the dial projects from two portions in the right-and-left direction on the rear surface side. FIGS. 18A and 18B illustrate a case wherein the dial projects from one portion on the front surface side and from two portions in the right-and-left direction on the rear surface side. A member 10' shown in FIGS. 18A and 18B is a member for detecting a dial operation from the right side of the rear surface. When the dial is operated from the right side of the rear surface, the member 10' is slid to turn on a detection switch 4'.

Figure 14:
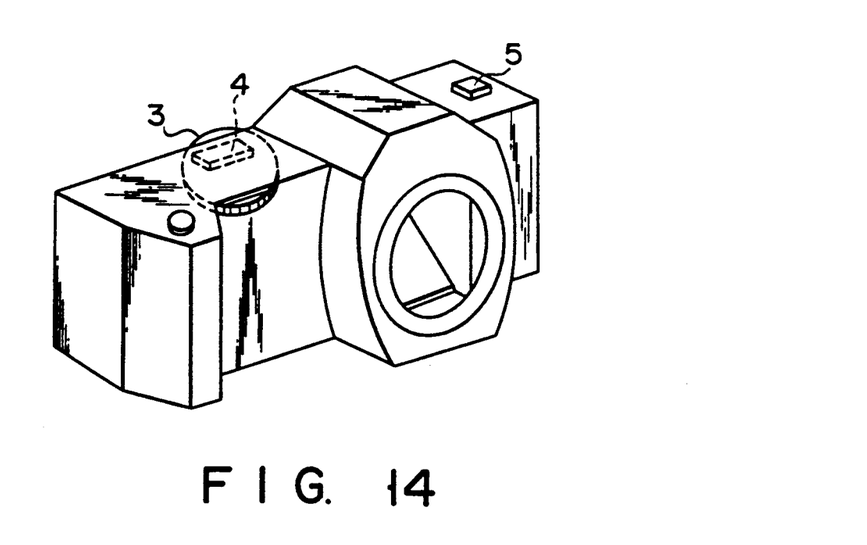
FIG. 14 is a perspective view for explaining a sixth embodiment of the present invention.

In FIG. 3, when the dial 3 is turned while depressing the sensitivity switch 5 and the mode switch 6, the selection switch 4 is invalidated. In a sixth embodiment of the present invention, as shown in FIG. 14, a switch 5 is used as a switch for selecting a film sensitivity/exposure mode, and a selection switch 4 is used as a switch for selecting one of the film sensitivity and the exposure mode. If multiple depression of these switches 4 and 5 is validated, the following operations are allowed.

TABLE 1

| Function of Switch 5 | Film sensitivity/Exposure Mode | |
|---|---|---|
| While Depressing Switch 5 | | |
| | Dial Front Surface Setting of Film Sensitivity | Dial Rear Surface Setting of Exposure Mode |
| Exposure | Without Depressing Switch 5 | |
| Mode | Dial Front Surface | Dial Rear Surface |
| P | Program Shift | Exposure Correction |
| Av | Aperture Value | Exposure Correction |
| Tv | Shutter Speed | Exposure Correction |
| M | Aperture Value | Shutter Speed |

(The exposure mode includes P: program mode, Av: aperture priority mode, Tv: shutter priority mode, and M: manual mode.)

For example, the following operations are allowed, and the number of operation members can be reduced, thus improving operability.

(1) When the dial is operated from the front surface side while depressing the switch 5, a film sensitivity setting operation is selected.

(2) When the dial is operated from the rear surface side while depressing the switch 5, an exposure mode setting operation is selected (in this case, the exposure mode is changed to the program, aperture priority, shutter priority, and manual modes in turn).

(3) (If the aperture priority mode is selected upon operation in (2)), when the dial is operated from the front surface, an aperture value setting operation is selected (in this case, if the exposure mode is the program mode, a program shift operation is selected; if the shutter priority mode, a shutter speed setting operation; and if the manual mode, the aperture value setting operation).

(4) When the dial is operated from the rear surface side, if the exposure mode is the aperture priority mode, an exposure correction value setting operation is selected; if the program mode and the shutter priority mode, the exposure correction value setting operation;

and if the manual mode, the shutter speed setting operation. A similar example will be exemplified below.

TABLE 2

| Function of Switch 5 | Film sensitivity/Exposure Mode |
| --- | --- |
| While Depressing Switch 5 | |
| Dial Front Surface Setting of Film Sensitivity | Dial Rear Surface Setting of Exposure Mode |
| Exposure Mode | Without Depressing Switch 5 |
| | Dial Front Surface | Dial Rear Surface |
| P | Setting of Exposure Mode | Program Shift |
| Av | | Aperture Value |
| Tv | | Shutter Speed |
| M | | Aperture Value |

In this case, for example, the following operations are allowed.

(1) When the dial is operated from the front surface side while depressing the switch 5, a film sensitivity setting operation is selected.

(2) When the dial is operated from the rear surface side while depressing the switch 5 with the switch 4 being ON, an exposure correction value setting operation is selected.

(3) When the dial is operated from the front surface side, an exposure mode setting operation is selected.

(4) When the dial is operated from the rear surface side, if the exposure mode is the program mode, a program shift operation is selected; if the aperture priority mode, an aperture value value setting operation; if the shutter priority mode, the shutter speed setting operation; and if the manual mode, the aperture value setting operation.

TABLE 3

| Function of Switch 5 | AF/Exposure Mode |
| --- | --- |
| While Depressing Switch 5 | |
| Dial Front Surface Setting of Focus Mode | Dial Rear Surface Setting of Setting of Exposure Mode |
| Exposure Mode | Without Depressing Switch 5 |
| | Dial Front Surface | Dial Rear Surface |
| P | Program Shift | Exposure Correction |
| Av | Aperture Value | Exposure Correction |
| Tv | Shutter Speed | Exposure Correction |
| M | Aperture Value | Shutter Speed |

In this case, for example, the following operations are allowed.

(1) When the dial is operated from the front surface side while depressing the switch 5, a focus mode setting operation is selected (the focus mode includes, e.g., an auto-focus mode, a power focus mode in which a focusing operation is performed by a motor upon a switch operation, and a manual focus mode, and the auto-focus mode also includes a single auto-focus mode in which an auto-focusing operation is stopped when an in-focus state is attained, and a continuous auto-focus mode in which the auto-focusing operation is continuously performed).

(2) When the dial is operated from the rear surface side while depressing the switch 5 with the switch 4 being ON, an exposure correction value setting operation is selected.

(3) When the dial is operated from the front surface side, if the exposure mode is the program mode, a program shift operation is selected; if the aperture priority mode, an aperture value setting operation; if the shutter priority mode, a shutter speed setting operation; and if the manual mode, an aperture value setting operation.

(4) When the dial is operated from the rear surface side, if the exposure mode is the program mode, the aperture priority mode, or the shutter priority mode, an exposure correction value setting operation is selected; and if it is the manual mode, a shutter speed setting operation is selected.

Figure 19:
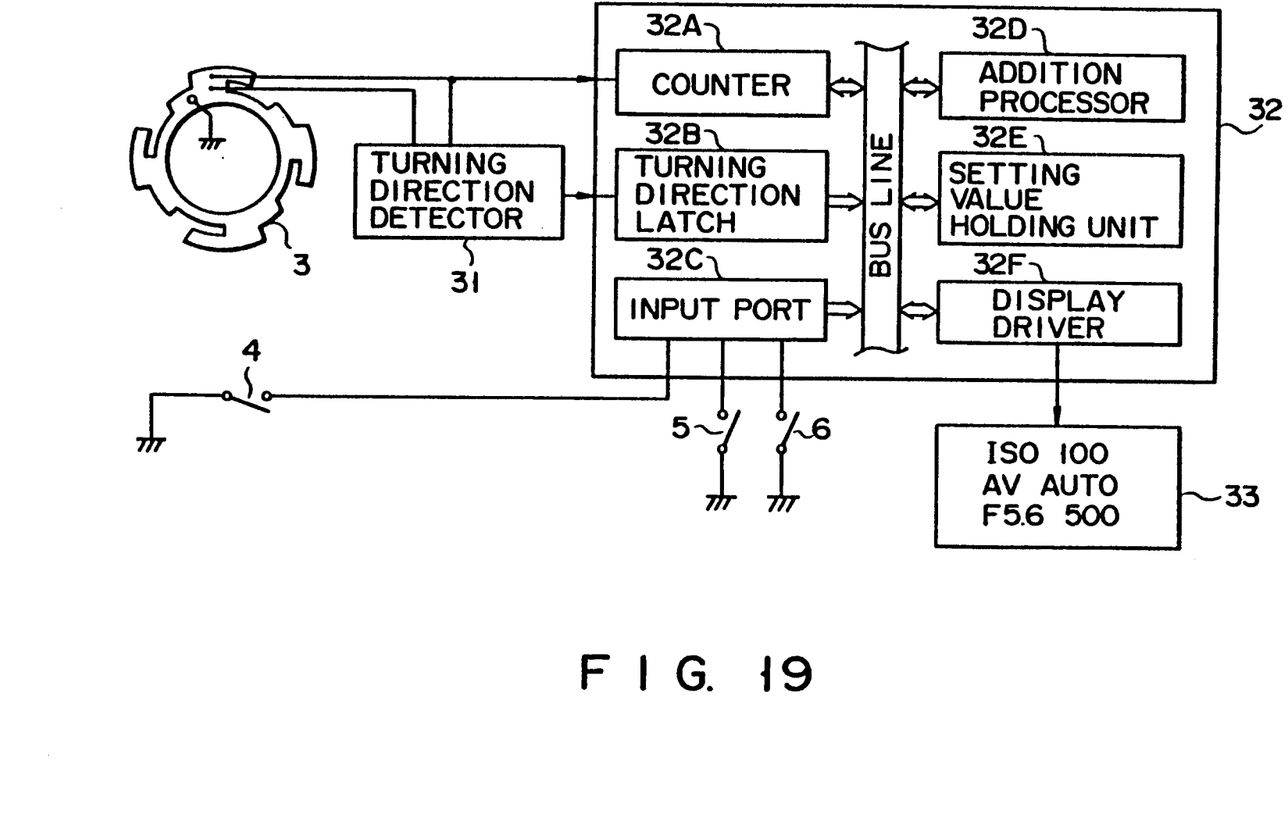
FIG. 19 is a schematic block diagram for explaining a seventh embodiment of the present invention.

FIG. 19 shows a seventh embodiment of the present invention in which the arrangement shown in the block diagram of FIG. 2 is constituted by a microcomputer (to be referred to as a CPU hereinafter).

The CPU includes a counter 32A for counting a turning amount of a dial, a turning direction latch 32B for temporarily storing turning direction data detected by a turning direction detector 31, and an input port 32C for receiving signals from switches 4, 5, and 6. The CPU selects one of photographing data in accordance with input signals from the switches 4, 5, and 6 and causes an addition processor 32D to perform addition or subtraction of a value (setting value) of the selected photographing data in accordance with the count value and the turning direction latch signal. The resultant photographing data is stored in setting value holding unit 32E. The CPU also has a display driver 32F, and displays photographing data set at that time.

Figure 20A:
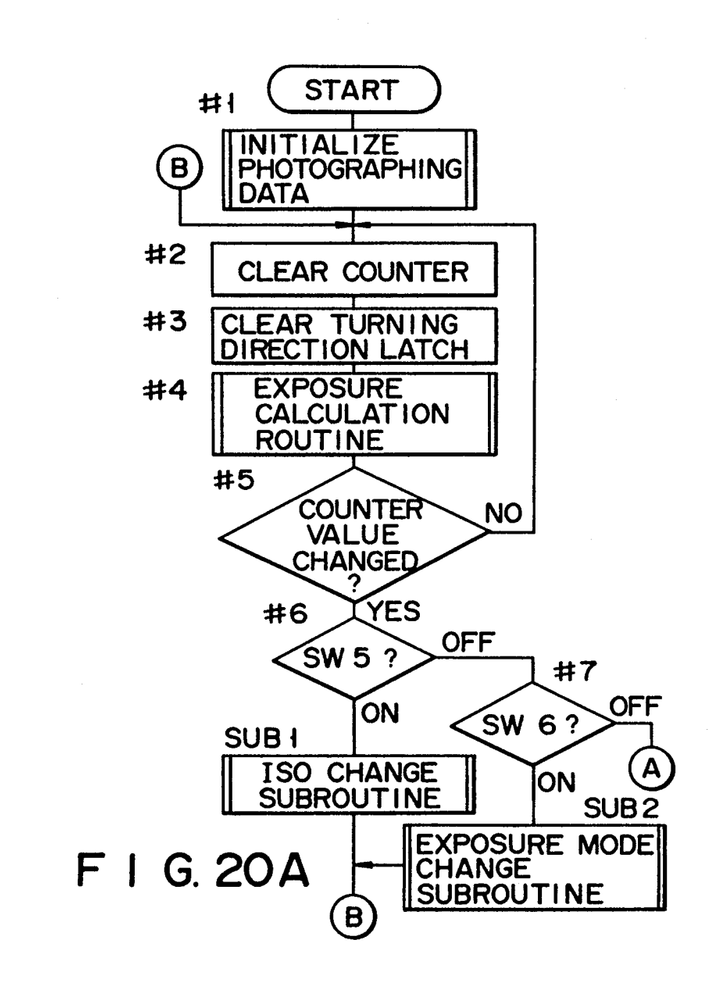
FIGS. 20A, 20B, and 21A to 21F are flow charts for explaining the operation of the arrangement shown in FIG. 19.
Figure 20B:
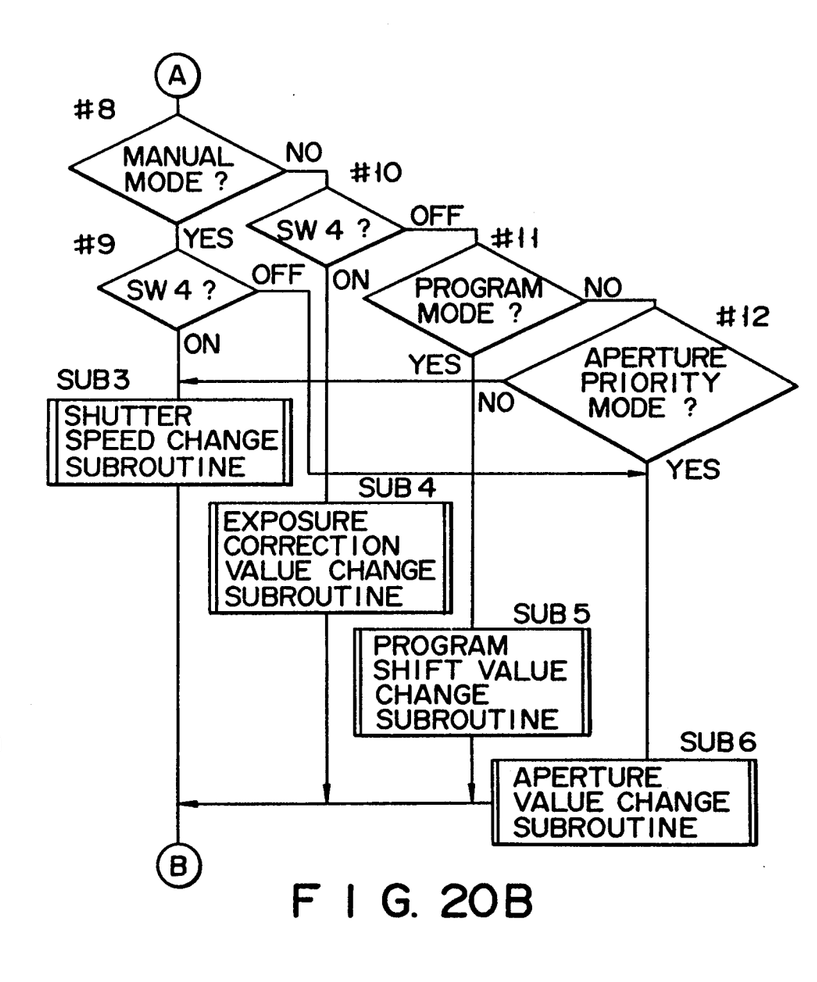

FIGS. 20A and 20B are flow charts for the CPU shown in FIG. 19 to process operations in FIG. 3.

In FIGS. 20A and 20B, portions "change ISO", "change exposure mode", "change shutter speed", "change exposure correction value", "change program shift value", and "change aperture value" represent photographing data to be changed depending on combinations of the depressed switches 4, 5, and 6, and these photographing data are changed by subroutines SUB1 to SUB6 shown in FIGS. 21A to 21F, respectively.

In FIG. 20A. of steps #1 to #7, a processing loop of steps #2, #3, #4, #5, and #2 is a normal loop when the dial is not operated. If the dial is operated while "exposure calculation" in step #4 is executed, an operation amount of the dial is input to the counter, and it is determined in step #5 that the count value of the counter is changed. The flow then advances to photographing data changing processing in step #6 and subsequent steps. After the changing processing is completed, the flow returns to step #2.

Figures 21A, 21B, 21C:
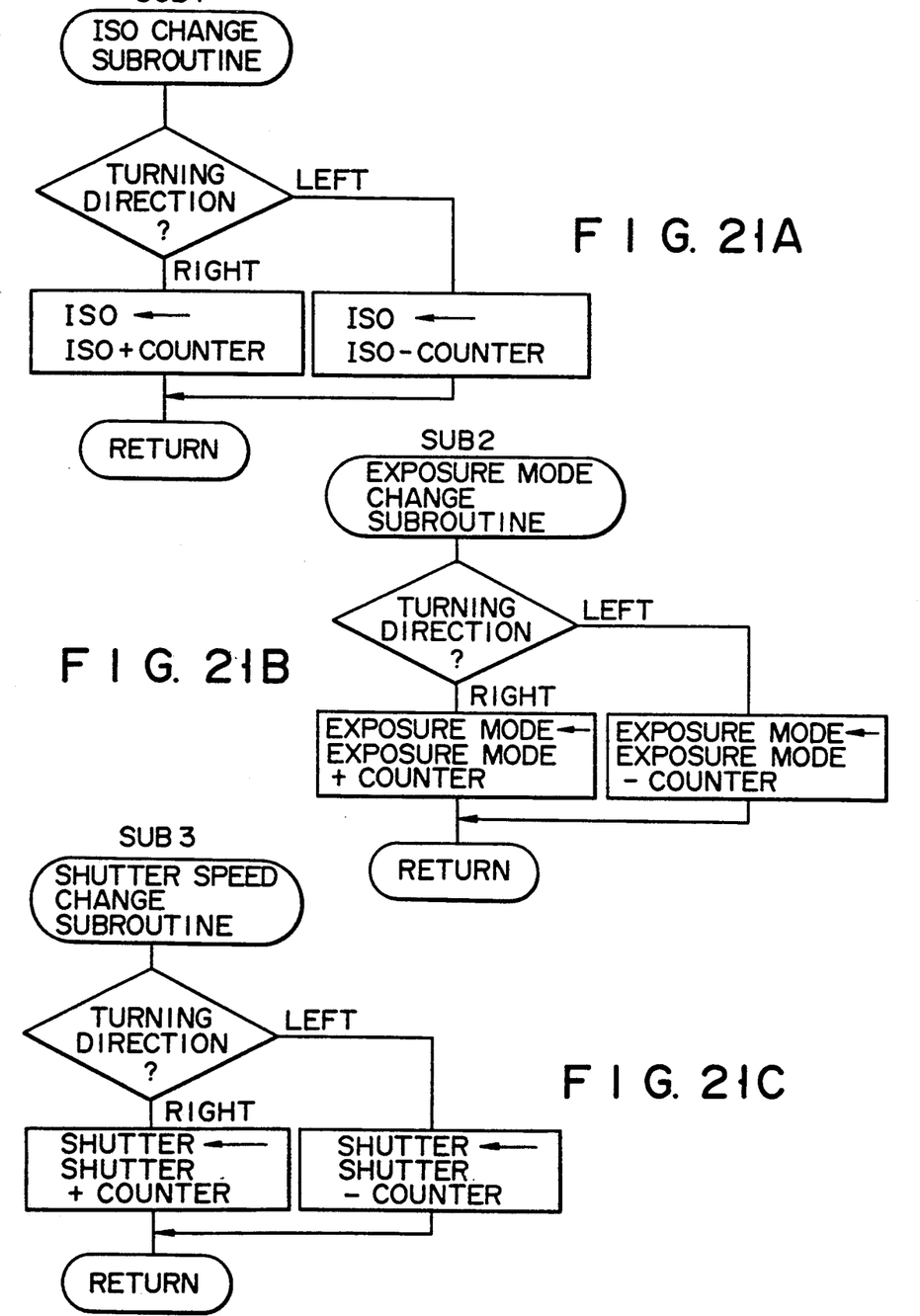
Figures 21D, 21E, 21F:
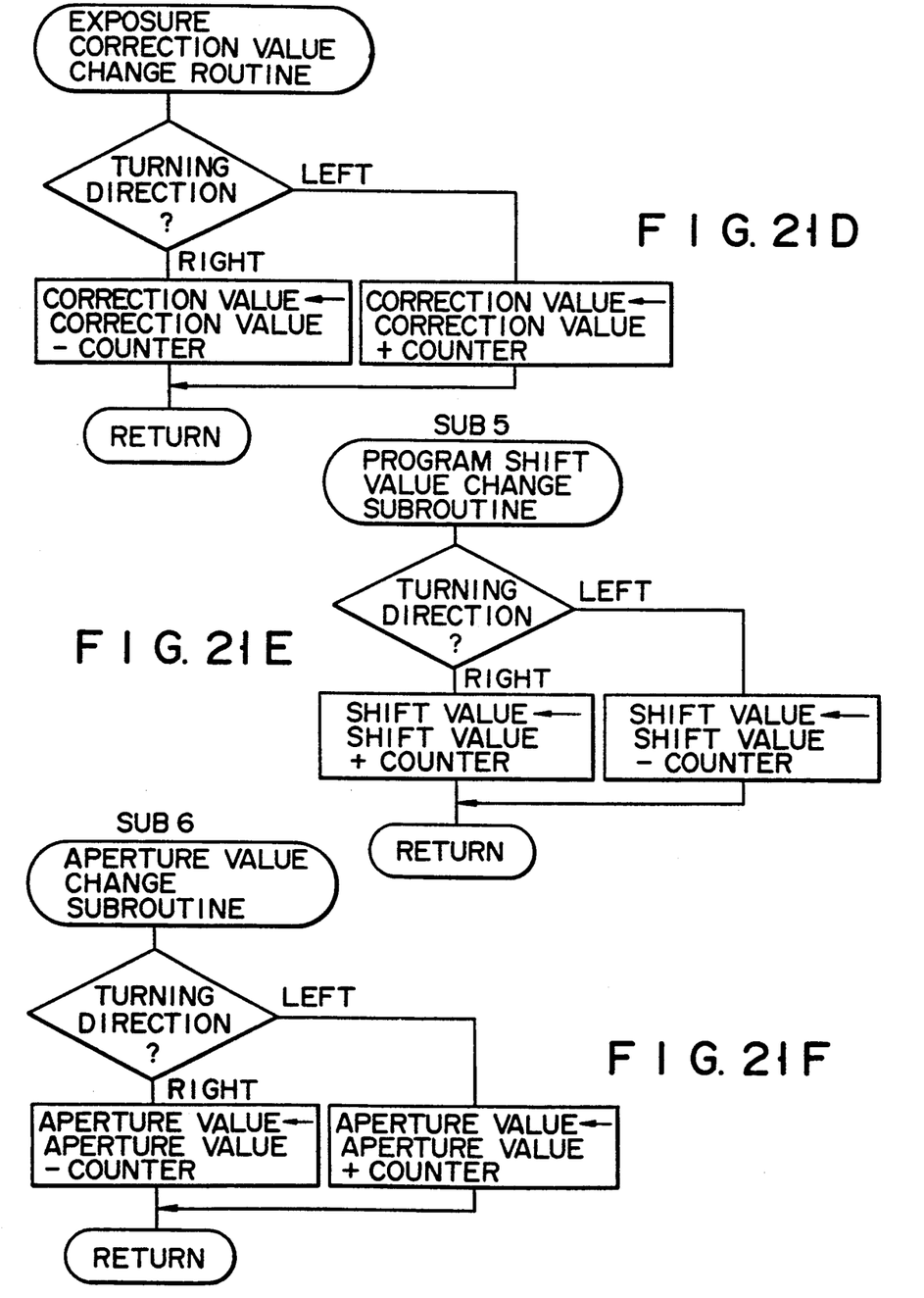
Figure 22:
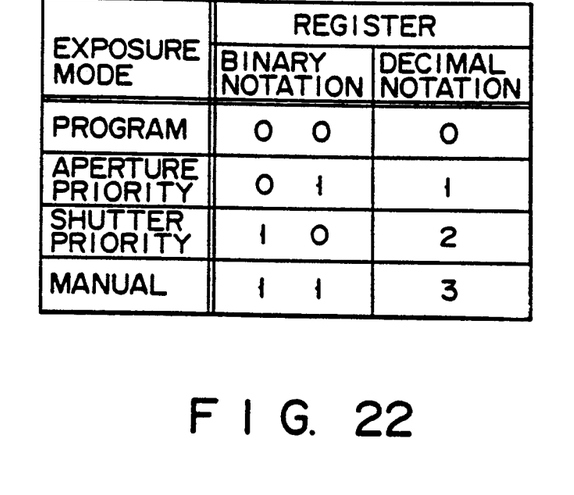
FIG. 22 is a view for explaining data in an exposure mode.

In an exposure mode change subroutine shown in FIG. 21B, the exposure mode is represented by 2-bit data shown in FIG. 22, and takes one of 0 to 3 upon addition/subtraction of the value of the exposure mode data. Of steps #8 to #12 in FIG. 20B, mode discrimination processing in steps #8, #11, and #12 is performed in accordance with the exposure mode data.

Figure 23:
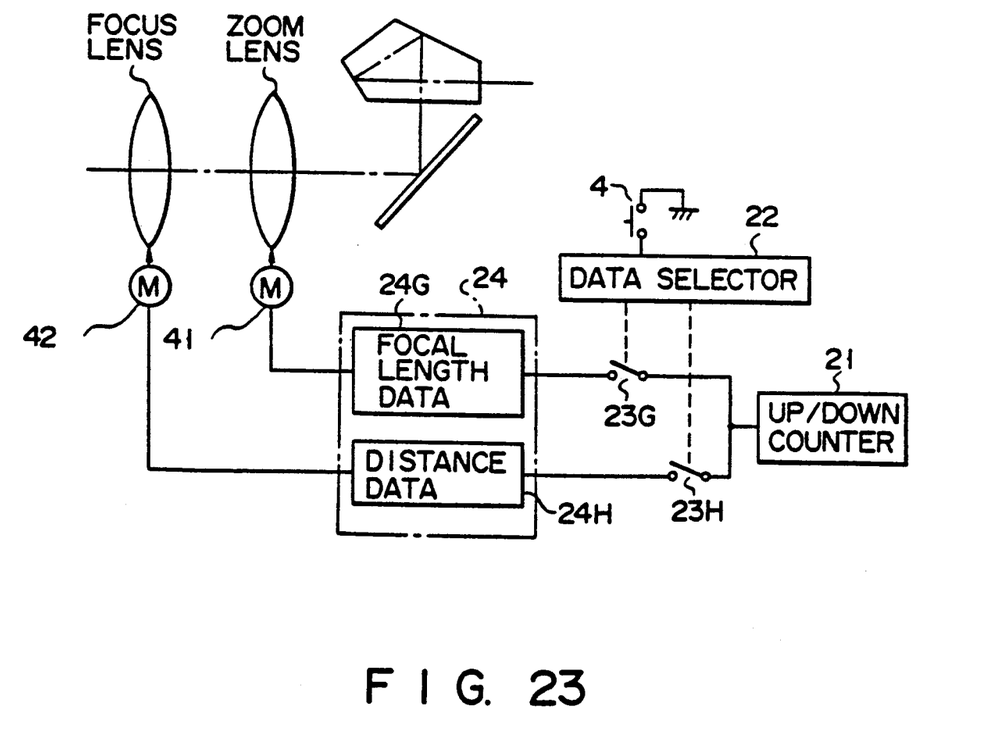
FIG. 23 is a schematic block diagram for explaining an eighth embodiment of the present invention.

FIG. 23 shows an eighth embodiment of the present invention in which a focus motor and a zoom motor are driven upon operation of a dial.

A photographing data holding section includes a focal length data holding section 24G and a distance data holding section 24H, and a value of an up/down counter 21 is input to one of these sections. For example, when a dial is operated without depressing a selection switch 4 (when the dial is operated from the front surface side), focal length data is set, and a zoom motor 41 is driven. When the selection switch 4 is depressed and the dial is operated (when the dial is operated from the rear surface side), distance data is set, and a focus motor 42 is driven. If these motors are, e.g., stepping motors which are rotated by a step angle corresponding to a designated pulse count, pulses corresponding to the set data value can be supplied to the motor. If these motors are DC motors, an encoder is provided to a lens to be driven, and an encoder output is compared with the set data value, so that the motors can be driven until a coincidence between these data is obtained.

What is claimed is:

1. A photographing data setting apparatus for a camera capable of setting a plurality of types of photographing data upon rotation of a single rotary member, comprising:
   a rotary operation member exposed from a plurality of portions of said camera so as to be operable at each of said plurality of exposed portions;
   detection means for detecting that said rotary operation member is operated at a predetermined one of said exposed portions;
   pulse signal generation means for generating a pulse signal upon rotation of said rotary operation member; and
   a photographing data setting circuit for setting predetermined photographing data according to a detection output from said detection means on the basis of a pulse output from said pulse signal generation means, thereby setting and storing the plurality of types of photographing data.

2. An apparatus according to claim 1, wherein said detection means comprises:
   an actuation member which extends along at least a portion of said rotary operation member, said actuation member being exposed from the camera in one direction corresponding to one of said plurality of exposed portions of said camera, and said actuation member being movable in a predetermined direction; and
   switch means, which is enabled when said actuation member is depressed from said one direction and is moved, for generating a detection signal in accordance with whether or not said rotary operation member is depressed from said one direction.

3. An apparatus according to claim 1, wherein said detection means comprises:
   a light-emitting diode and a light-receiving element which are arranged in one portion of the plurality of portions of said camera at positions where an operation of said rotary operation member can be detected; and
   a light detection circuit for discriminating an incident state of light emitted from said light-emitting diode to said light-receiving element in accordance with an operation of said rotary operation member,
   said light detection circuit including means for generating a detection signal in accordance with whether or not said rotary operation member is depressed from a direction corresponding to said one portion.

4. An apparatus according to claim 1, wherein
   said rotary operation member comprises a slidable rotating shaft, and
   said detection means comprises a switch which is enabled upon sliding of said rotating shaft when said rotary operation member is operated from one direction,
   said switch generating a detection signal in accordance with whether or not said rotary operation member is depressed from said one direction.

5. An apparatus according to claim 1, wherein said detection means comprises:
   conductive contact patterns provided on upper and lower surfaces of said rotary operation member; and
   a contact detection circuit for detecting an electrical connection between the contact patterns when said rotary operation member is operated from one direction,
   said contact detection circuit including means for generating a detection signal in accordance with whether or not said rotary operation member is depressed from said one direction.

6. An apparatus according to claim 1, wherein:
   the camera has a front-surface side on which a lens-barrel is mountable, and a rear-surface side; and
   a portion of said rotary operation member is exposed from said front-surface side of said camera, and another portion of said rotary operation member is exposed from said rear-surface side of said camera.

7. An apparatus according to claim 1, wherein:
   the camera has a front-surface side on which a lens-barrel is mountable;
   a portion of said rotary operation member is exposed from one portion of said front-surface side of said camera, and another portion of said rotary operation member is exposed from another portion of said front-surface side of said camera.

8. An apparatus according to claim 1, wherein different portions of said rotary operation member are exposed from three different portions of said camera in different directions.

9. An apparatus according to claim 1, further comprising:
   exposure control mode setting means for setting one of a plurality of exposure control modes, and
   wherein said photographing data setting circuit includes means for determining photographing data to be set in accordance with the set exposure control mode and the detection output.

10. An apparatus according to claim 9, wherein said exposure control mode setting means comprises:
    a mode setting button, said mode setting button being depressed to set a photographing mode.

11. A photographing data setting apparatus for a camera capable of setting a plurality of photographing data, comprising:
    photographing mode setting means for setting a plurality of photographing data;
    a single rotary operation member which is exposed from a plurality of portions of said camera and which can be rotated from a plurality of directions;
    counter means for counting pulses according to a rotational amount of said rotary operation member; and
    data selection means for supplying a content of said counter means to a photographing data holding unit in accordance with the photographing mode and a selection signal.

12. An apparatus according to claim 11, wherein said data selection means comprises:
    an actuation member which is exposed from the camera in one direction corresponding to one of the plurality of portions of said camera, said actuation member being movable in a predetermined direction and extending along a portion of said rotary operation member, and switch means arranged for being enabled when said actuation member is pushed from said one direction and in a back-and-forth direction; and means for generating a first selection signal when said switch means is enabled and for generating a second selection signal when said switch means is disabled.

13. An apparatus according to claim 11, wherein said data selection means comprises:

a light-emitting diode and a light-receiving element which are arranged in one portion of the plurality of portions of said camera at positions where an operation of said rotary operation member can be detected, and circuit means for detecting that light emitted from said light-emitting diode to said light-emitting element is shielded upon the finger of a user being placed upon said rotary operation member said one portion of said camera; and means for generating a selection signal indicating which portion of said rotary operation member is touched.

14. An apparatus according to claim 11, wherein:

said rotary operation member comprises a slidable rotating shaft, and said data selection means comprises:

a switch having an enable/disable state, and which is enabled upon a slide movement of said rotational shaft when said rotary operation member is operated from one direction, and means for generating a selection signal indicating which portion of said rotary operation member is touched in accordance with an enable/disable state of said switch.

15. An apparatus according to claim 11, wherein said data selection means comprises:

conductive contact patterns provided on upper and lower surfaces of said rotary operation member, a circuit for detecting that an operator contacts said contact patterns upon operation of said rotary operation member from one direction, and means for generating a selection signal indicating which portion of said rotary operation member is touched.

16. A photographing data setting apparatus for a camera capable of setting a plurality of photographing data, comprising:

a single rotatable operation member having a center of rotation in the camera body, and wherein portions of said rotatable operation member are exposed from a plurality of portions of said cameral;

selection means for generating a signal indicating a selected portion of the plurality of portions of said camera;

pulse outputting means for generating pulses in accordance with rotation of said rotatable operation member;

counter means for counting output pulses from said pulse generation means;

photographing data holding means having a plurality of registers for storing the plurality of photographing data; and data selection means for selectively storing a pulse count counted by said counter means in one of said plurality of registers of said photographing data holding means in accordance with the selection signal from said selection means.

17. An apparatus according to claim 16, wherein:

said pulse generation means comprises two terminals contacting two comb-shaped electrodes having different phases, and said counter means comprises an up/down counter for switching incremental and decremental counting operations in accordance with phases of two pulse waveforms output from said terminals.

18. An apparatus according to claim 16, further comprising:

photographing mode setting means for setting a photographing mode for exposure control of said camera, and wherein said data selection means includes means for selecting one of said plurality of registers in accordance with the selection signal and the photographing mode.

19. A photographing data setting apparatus for a camera capable of setting a plurality of photographing data, comprising:

a data setting operation member for setting photographing data of the camera by manual operation, said operation member being partially covered by a camera body and exposed from a plurality of portions of said camera body; and detection means, arranged near the plurality of exposed portions of said data setting operation member for detecting at which portion said manual data setting operation is performed and for generating a detection signal;

photographing data storing means for determining a type of data corresponding to a photographing operation to be set in accordance with the detection signal and for storing an output from said data setting operation member as the determined type of data.

20. A photographing data setting apparatus for a camera capable of setting a plurality of photographing data, comprising:

manually actuatable switch means for being manually actuated;

a single rotary operation member which is exposed from a plurality of portions of said camera and which can be rotated;

detection means for detecting a rotational amount of said rotary operation member;

selection signal generation means for generating a selection signal in response to a portion of the signal rotary operating member upon which a user places his finger; and determination means for determining a type of data, corresponding to a photographing operation, to be set by a rotational amount from said rotary operation member in accordance with a combination of whether or not said switch means is actuated and said selection signal.

21. A photographing data setting method for a camera capable of setting a plurality of types of photographing data upon rotation of a single rotary operation member which is exposed from a plurality of portions of said camera so as to be operable from a plurality of directions, comprising the steps of:

detecting a rotational amount of said rotary operation member responsive to a manual rotation of said rotary operation member;

detecting which portion of said rotary operation member is operated; and determining a type of data to be set in accordance with the detected portion, and setting data based on the detected rotational amount.

22. A method according to claim 21, wherein said step of detecting a rotational amount includes the steps of:

converting a detected rotational amount of said rotary operation member into pulses, responsive to rotation of said rotary operation member; and detecting the number of pulses counted by a counter, the counted pulses corresponding to the rotational amount of said rotary operation member.

23. A photographing data setting method for a camera capable of setting a plurality of types of photographing data upon rotation of a single rotary operation member which is exposed from a plurality of portions of said camera so as to be operable from a plurality of directions, comprising the steps of:

detecting a photographing mode for exposure control;

detecting a rotational amount of said rotary operation member responsive to a manual rotation of said rotary operation member;

detecting which portion of said rotary operation member is operated; and determining a type of data to be set in accordance with the detected portion and the detected photographing mode, and setting data based on the detected portion and the detected photographing mode.

24. An apparatus according to claim 6, wherein said rotary operation member is exposed only from said front-surface and rear-surface sides of said camera.

25. An apparatus according to claim 7, wherein said rotary operation member is exposed only from said front-surface side of said camera.

* * * * *